United States Patent [19]

Usubuchi

[11] Patent Number: 4,633,325
[45] Date of Patent: Dec. 30, 1986

[54] ADAPTIVE PREDICTIVE ENCODING AND/OR DECODING APPARATUS

[75] Inventor: Touru Usubuchi, Tokyo, Japan

[73] Assignee: NEC Corporation, Tokyo, Japan

[21] Appl. No.: 646,539

[22] Filed: Sep. 4, 1984

[30] Foreign Application Priority Data

Sep. 1, 1983 [JP] Japan ................................ 58-160774
Sep. 1, 1983 [JP] Japan ................................ 58-160775

[51] Int. Cl.$^4$ .......................... H04N 1/00; H04N 7/12
[52] U.S. Cl. .................................... 358/260; 358/263; 358/133; 358/13; 375/27
[58] Field of Search ............... 358/260, 261, 263, 133, 358/138, 13; 375/27, 31, 33

[56] References Cited

U.S. PATENT DOCUMENTS

| 4,141,034 | 2/1979 | Natravali et al. | 358/13 |
| 4,144,547 | 3/1979 | Stoffel | 358/260 |
| 4,193,096 | 3/1980 | Stoffel | 358/138 |
| 4,470,072 | 9/1984 | Tamaka et al. | 358/260 |

*Primary Examiner*—James J. Groody
*Assistant Examiner*—John K. Peng
*Attorney, Agent, or Firm*—Sughrue, Mion, Zinn, Macpeak and Seas

[57] ABSTRACT

An adaptive predictive encoding apparatus generates predictive values $P_1, P_2, \ldots, P_n$ with respect to a quantized value X of a picture element x. Predictive error signals $Y_1, Y_2, \ldots, Y_n$ are obtained from the quantized value X and the predictive values $P_1, P_2, \ldots, P_n$. A prediction selection circuit determines the number of mis-predictions from each of the predictive error signals for scanned picture elements. A selection signal M is produced indicating the prediction error signal Y with the least number of mis-predictions, the selection signal controlling a selector to provide the prediction error signal Y in response to the selection signal M. The selected predictive error signal Y is encoded to produce an encoded signal. An adaptive predictive decoding apparatus which decodes the encoded selected predictive error signal is also disclosed.

12 Claims, 9 Drawing Figures

ADAPTIVE PREDICTIVE ENCODING AND/OR DECODING APPARATUS

BACKGROUND OF THE INVENTION

This invention relates to an adaptive predictive encoding and decoding apparatus for predictive encoding and predictive decoding a screen image in which a half-tone is represented by binary signals.

In such a conventional predictive encoding system, as described in, for example, the U.S. Pat. No. 4,144,547 entitled "APPARATUS AND METHOD FOR ENCODING HALFTONE AND LINE COPY DATA" issued to Stoffel, the number of mis-predicted picture elements for each of the predictive error signals produced for a predetermined block are compared and the predictive error signal having the least mis-predicted picture elements is selected. Such a conventional system has the disadvantages that a sufficient prediction effect is not expected in the case where the prediction is changed from one prediction mode to the other, and significant data-compression can not be obtained because it is necessary to use a prediction mode code representative of a selected prediction mode.

It is, therefore, an object of this invention to provide an adaptive predictive encoding and decoding apparatus in which a high prediction effect can be obtained without using a prediction mode code representative of a selected prediction mode.

SUMMARY OF THE INVENTION

According to one aspect of this invention, there is provided an adaptive predictive encoding apparatus comprising:

means for generating a plurality of predictive values $P_1, P_2, ---, P_n$ with respect to a quantized value X of a picture element x from quantized values of neighboring picture elements, a plurality of picture elements $y_1, y_2, ---, y_n$ having the same phase relationship as said picture element x relative to their respective neighboring picture elements on a two-dimensional screen-period pattern, and their neighboring picture elements;

means for obtaining predetermined predictive error signals $Y_1, Y_2, ---, Y_n$ from said quantized value X and said plurality of predictive values $P_1, P_2, ---, P_n$;

means for comparing degrees of mis-prediction in the predictive error signals for the already scanned picture elements to provide a comparison result;

means for generating a selection signal in response to said comparison result;

means for selecting one from said plurality of predictive error signals $Y_1, Y_2, ---, Y_n$ to provide a predictive error signal Y in response to said selection signal; and means for encoding said predictive error signal Y to produce an encoded signal.

According to another aspect of this invention, there is provided an adaptive predictive decoding apparatus for decoding an encoded signal which is produced by encoding an predictive error signal Y, which is obtained by selecting one of a plurality of predictive error signals $Y_1, Y_2, ---, Y_n$ obtained from a quantized value X of a picture element x and a plurality of predictive values $P_1, P_2, ---, P_n$ with respect to said value X, said decoding apparatus comprising:

means for decoding said encoded signal to produce said predictive error signal Y;

means for obtaining a plurality of decoded signals $X_1, X_2, ---, X_n$ from said predictive error signal Y and a plurality of predictive values $P_1, P_2, ---, P_n$;

means for generating said predictive values $P_1, P_2, ---, P_n$ from a neighboring picture element to said picture element x, a plurality of picture elements $y_1, y_2, ---, y_m$ having the same phase-relationship as said picture element x in respect to respective neighboring picture elements on a two-dimensional screen-period pattern, and neighboring picture elements to said plurality of picture elements $y_1, y_2, ---, y_m$;

means for obtaining a plurality of predictive error signals $Y_1, Y_2, ---, Y_n$ from said quantized value X and said plurality of predictive values $P_1, P_2, ---, P_n$;

means for calculating degrees of mis-prediction for said plurality of predictive values $P_1, P_2, ---, P_n$ from predictive error signals $Y_1, Y_2, ---, Y_n$ for the already scanned picture elements to provide a calculation result; and means for selecting one from said plurality of decoded signals $X_1, X_2, ---, X_n$ to provide the quantized value X of said picture element x.

BRIEF DESCRIPTION OF THE DRAWINGS

Other features and advantages of this invention will be apparent from the following detailed description of preferred embodiments of this invention taken in conjunction with the accompanying drawings, wherein.

DETAILED DESCRIPTION OF THE PREFERRED EMBODIMENTS

Figure 1:
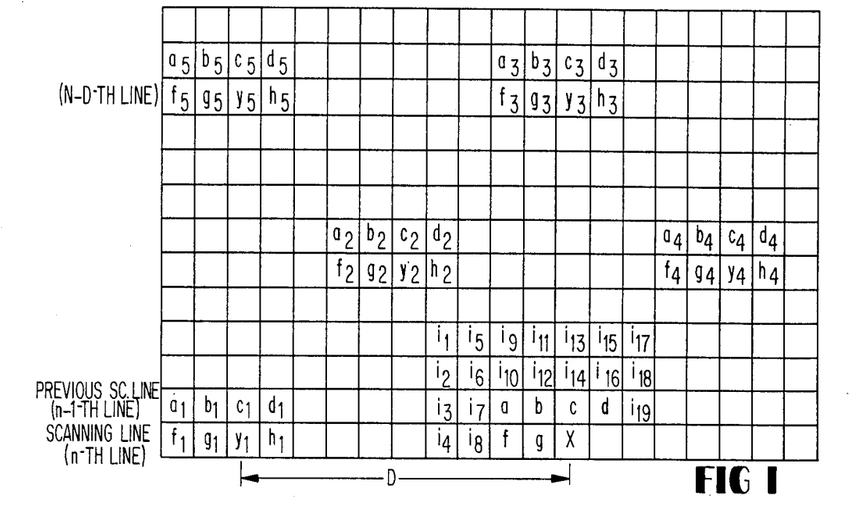
FIG. 1 is a schematic representation of a 45° slant screen image and the relationship between reference picture elements and selected picture elements used to determine mis-predictions occurring for different predictive error signals.

Prediction methods will be described with reference to FIG. 1 showing the relationship between reference picture elements and picture elements used in comparing mis-predictions resulting from different error signals produced using different predictive methods. In FIG. 1, a 45°-slant screen image is shown, and a distance D stands for a screen period (in this example, D=10 samples). Picture elements $y_1, y_2, ---, y_5$ and picture element x of quantized value X have the same phase-relationship relative to their respective neighboring picture elements on a two-dimensional screen-period pattern.

In a first predictive method (mode), the quantized value X is predicted from quantized values A, B, C, D, F and G of neighboring picture elements a, b, c, d, f, and g to the picture element x, a quantized value $y'_1$ of the picture element $y_1$ spaced from the picture element x by the screen period in the scanning direction, and quantized values $B_1$, $C_1$, $D_1$, $G_1$, and $H_1$ of picture elements $b_1$, $c_1$, $d_1$, $g_1$ and $h_1$ which are neighbors of the picture element $y_1$.

In a second prediction method (mode), the quantized value X is predicted from the quantized value A, B, C, D, F and G of the picture elements a, b, c, d, f and g which are neighbors of the picture element x, a quantized values $y'_2$ of the picture element $y_2$ spaced from the picture element x by the screen period in a slant direction, and quantized values $B_2$, $C_2$, $D_2$, $G_2$ and $H_2$ of picture elements $b_2$, $c_2$, $d_2$, $g_2$ and $h_2$ which are neighbors of the picture element $y_2$.

In a third prediction method (mode), the quantized value X is predicted from quantized values $Y'_3$, $Y'_4$, - - - $Y'_m$ of the picture elements $y_3$, $y_4$, - - - , $y_m$ having the same phase-relationship as the picture element x relative to their respective neighboring picture elements.

Figure 2:
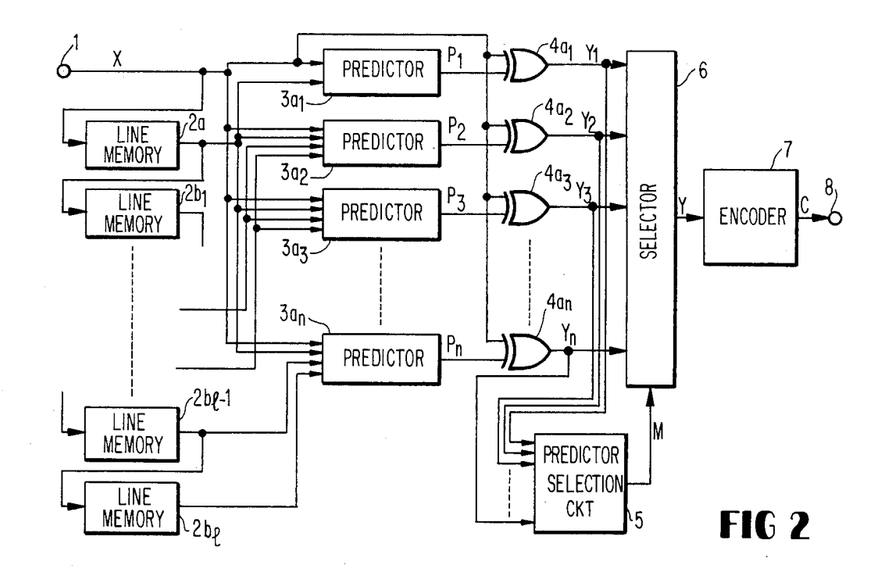
FIG. 2 is a block diagram of an adaptive predictive encoding apparatus according to a first embodiment of this invention.

Referring to FIG. 2 showing an adaptive predictive encoding apparatus according to a first embodiment of this invention, a terminal 1 is supplied with a binary image signal which is produced by quantizing an image. The binary signal having a quantized value X is supplied to a line memory 2a, and predictors $3a_1$, $3a_2$, - - - , $3a_n$. The line memory 2a delays the binary signal by one line of the image, and more specifically, by H-6=7994 samples while representing one line of the image by H=8000 samples. Line memories $2b_1$, $2b_2$, - - - , $2b$ delay the binary signal X and obtain the output signals delayed by one line, two lines, - - - , l lines with respect to the output signal of the line memory 2a, respectively.

The predictors $3a_1$, $3a_2$, - - - , $3a_n$, each of which is composed of shift registers and a read-only-memory (ROM), generate respective predictive values $P_1$, $P_2$, - - - , $P_n$ at their output terminals in accordance with the relationship shown in FIG. 1. Thus, predictors $3a_1$, $3a_2$, - - - , $3a_n$ generate the predictive values $P_1$, $P_2$, - - - , $P_n$ in prediction modes different from one another. For example, three of the predictors can generate predictive values in the first, second, and third prediction modes described with reference to FIG. 1.

The predictive values $P_1$, $P_2$, - - - , $P_n$ are supplied to exclusive OR circuits $4a_1$, $4a_2$, - - - , $4a_n$, which are supplied with the quantized value X to provide at their output terminals the predictive error signals $Y_1$, $Y_2$, - - - , $Y_n$, respectively. The predictive error signals $Y_1$, $Y_2$, - - - , $Y_n$ are supplied to a predictor selection circuit 5 and a selector 6. The predictor selection circuit 5 compares the number of mis-predicted picture elements included in each of the predictive error signals $Y_1$, $Y_2$, - - - , $Y_n$ of, for example, the already scanned picture elements a, b, c, d, f, g, $i_5$ to $i_{19}$ shown in FIG. 1, and selects the predictive error signal(Y) having the least number of the mis-predicted picture elements in the already scanned picture elements to output it as a selecting signal M for selecting the predictive error signal for the picture element now scanning.

The selector 6 selects the predictive error signal Y from the predictive error signals $Y_1$, $Y_2$, - - - , $Y_n$ in response to the selection signal M on a picture element-to-picture element basis. The predictive error signal Y is encoded in an encoder 7 such as a conventional run-length encoder to produce an output code C at an output terminal 8.

Figures 3, 4:
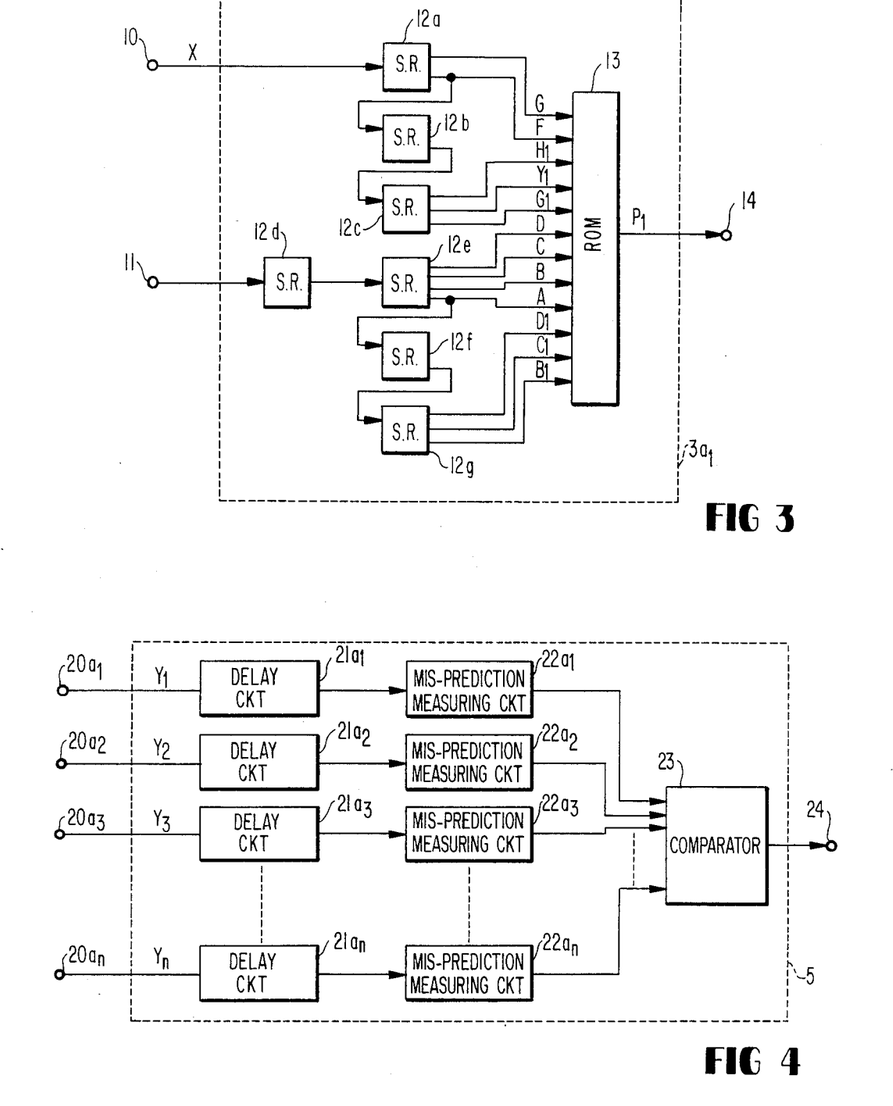
FIG. 3 is a block diagram of a predictor $3a_1$ used in the first embodiment of the invention shown in FIG. 2.
FIG. 4 is a block diagram of a predictor selection circuit 5 used in the first embodiment of the invention shown in FIG. 2.

Referring to FIG. 3 showing the predictor $3a_1$ operating in the first prediction mode and used in the encoding apparatus shown in FIG. 2, terminals 10 and 11 are supplied with the non-delayed signal X and a one-line-delayed signal from the line memory 2a, respectively. The non-delayed signal X is delayed by 1 sample, 2 samples, and 9 to 11 samples in shift registers 12a, 12b and 12c to provide the quantized values F, G, $H_1$, $Y'_1$ and $G_1$ for the picture elements f, g, $h_1$, $y_1$ and $g_1$ of FIG. 1, respectively.

The one-line-delayed signal, which is obtained from the signal X by delaying (H-6)=7994 samples and applied to the terminal 11, is delayed by 4 samples in a shift register 12d, and then further delayed by 1 to 4 samples and 11 to 13 samples in shift registers 12e, 12f and 12g to provide the quantized values D, C, B, A, $D_1$, $C_1$ and $B_1$ for the picture elements d, c, b, a, $d_1$, $c_1$ and $b_1$ of FIG. 1, respectively.

The quantized values A, B, C, D, F, G, $B_1$, $C_1$, $D_1$, $G_1$, $H_1$ and $Y'_1$ are supplied to a read-only-memory (ROM) 13 as address data to thereby provide the predictive values $P_1$ at its output terminal 14.

Similarly, it is possible for the predictors $3a_2$ and $3a_n$ to operate in the second and third prediction modes using shift registers and ROM's.

In each of predictors $3a_1$, $3a_2$ and $3a_n$, only one picture element having the same phase-relationship with its neighboring picture elements as the picture element x does with its neighboring picture elements is used as the reference picture element. However, two or more picture elements having the same phase-relationship as the picture element x can be employed as the reference picture elements. For example, it is possible for a predictor to use the quantized values B, C, G, $Y'_1$, $C_1$, $G_1$, $Y'_2$, $C_2$, $G_2$, $Y'_3$, $C_3$ and $G_3$ for the neighboring picture elements b, c and g to the picture element x, the picture elements $y_1$, $y_2$, and $y_3$ having the same phase-relationship with the picture element x and neighboring picture elements $c_1$, $g_1$, $c_2$, $g_2$, $c_3$ and $g_3$.

Referring to FIG. 4 showing the predictor selection circuit 5, terminals $20a_1$, $20a_2$, - - - , $20a_n$ are supplied with the predictive error signals $Y_1$, $Y_2$, - - - , $Y_n$, respectively. The predictive error signal $Y_1$ is delayed in a delay circuit $21a_1$ composed of line memories and shift registers to produce the predictive error signals $Y_{1i1}$, $Y_{1i2}$, $Y_{1i3}$, $Y_{1i4}$, $Y_{1i17}$, $Y_{1i18}$, $Y_{1i19}$ and $Y_{1g}$ for the picture elements $i_1$, $i_2$, $i_3$, $i_4$, $i_{17}$, $i_{18}$, $i_{19}$ and g of FIG. 1, which are then supplied to a mis-prediction measuring circuit $22a_1$ composed of a ROM, adder and register.

In the mis-prediction measuring circuit $22a_1$, the sum of the mis-prediction in the predictive error signals $Y_{1i5}$ to $Y_{1i19}$, $Y_{1a}$, $Y_{1b}$, $Y_{1c}$, $Y_{1d}$, $Y_{1f}$ and $Y_{1g}$ for the already scanned picture elements $i_5$ to $i_{19}$, a, b, c, d, f and g are counted. More specifically stated, the sum of the mis-prediction in the picture element now scanning is obtained by adding the predictive error signals $Y_{1i17}$, $Y_{1i18}$ and $Y_{1i19}$ to the sum of the mis-prediction for the previous picture element and then subtracting the predictive error signals $Y_{1i1}$, $Y_{1i2}$, $Y_{1i3}$ and $Y_{1i4}$.

Similarly, the predictive error signals $Y_2$, $Y_3$, - - - , $Y_n$ are delayed in delay circuits $21a_2$, $21a_3$, - - - , $21a_n$, and then supplied to mis-prediction measuring circuits $22a_2$, $22a_3$, - - - , $22a_n$, in which the numbers of mis-predicted picture elements are counted, respectively. The numbers of mis-predicted picture elements counted in the mis-prediction measuring circuits $22a_1$, $22a_2$, - - - , $22a_n$ are supplied to a comparator 23, in which the numbers of mis-predicted picture elements in the already scanned picture elements $i_5$ to $i_{19}$, a, b, c, d, f and g with respect to the predictive error signals $Y_1$, $Y_2$, - - - , $Y_n$ are compared with one another to provide a selection signal M for selecting the predictive error signal Y for the picture element x now scanning.

In comparing the degrees of mis-prediction, it is possible to use weighting in accordance with the distance to the picture element now scanning. Further, the range of the predictive error signals to be compared with the mis-predictions can be restricted to the picture elements in the area corresponding to the size of the screen vicinity of the picture element x.

Figure 5:
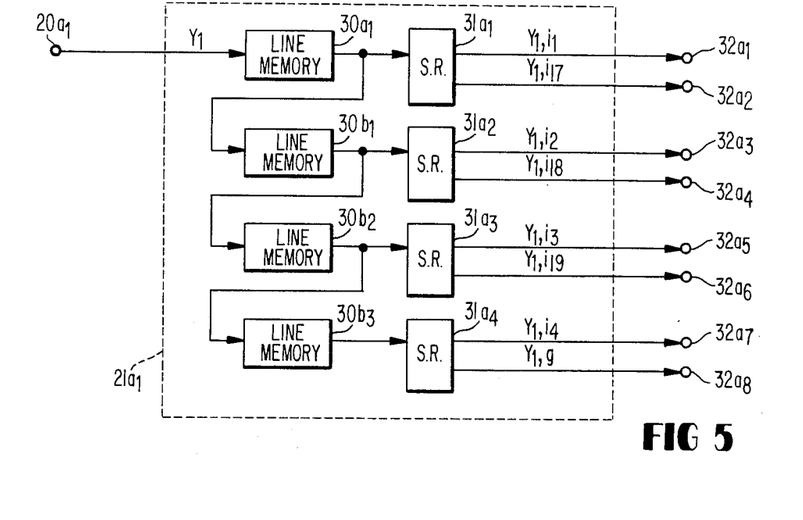
FIG. 5 is a block diagram of a delay circuit $21a_1$ used in the predictor selection circuit 5 shown in FIG. 4.

Referring to FIG. 5 showing the delay circuit $21a_1$, terminal $20a_1$ is supplied with the predictive error signal $Y_1$. A one-line memory $30a_1$ delays the predictive error signal $Y_1$ by (H-2)=7998 samples. One line memories $30b_1$, $30b_2$ and $30b_3$ respectively delay their input signals by one line to provide at their output terminals the signals delayed by 1, 2 and 3 lines with respect to the output signal of the one-line memory $30a_1$.

Shift registers $31a_1$, $31a_2$, $31a_3$ and $31a_4$ respectively delays the signals by 1 to 7 and 4 to 7 samples to provide, at output terminals $32a_1$ to $32a_8$, the predictive error signals $Y_{1i1}$, $Y_{1i2}$, $Y_{1i3}$, $Y_{1i4}$, $Y_{1i17}$, $Y_{1i18}$, $Y_{1i19}$, $Y_{1g}$ for the picture elements $i_1$, $i_2$, $i_3$, $i_4$, $i_{17}$, $I_{18}$, $i_{19}$ and g of FIG. 1.

Figure 6:
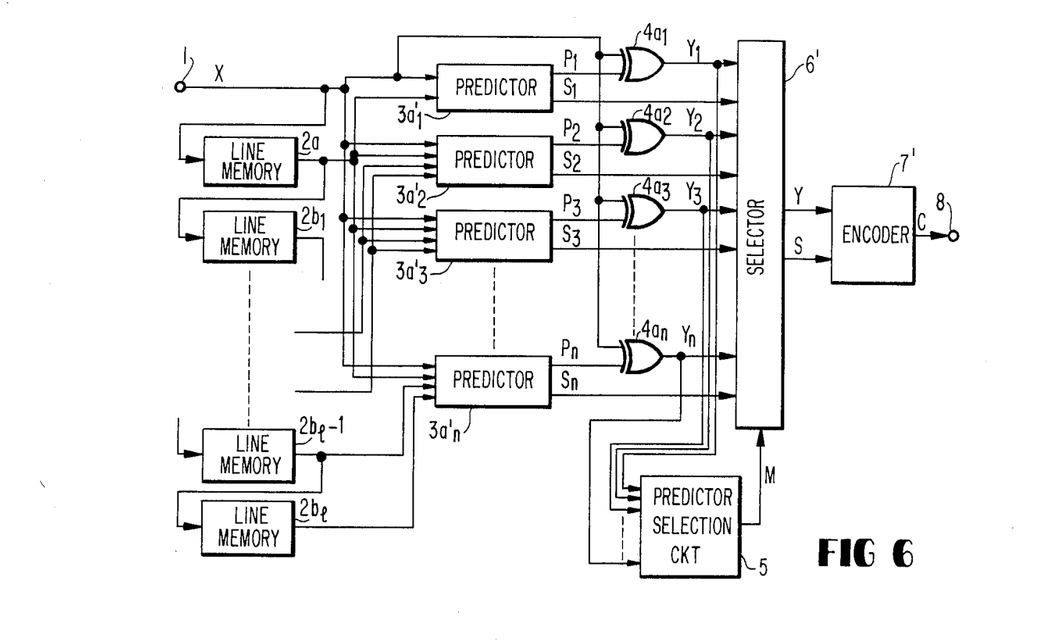
FIG. 6 is a block diagram of an adaptive predictive encoding apparatus according to a second embodiment of this invention.
Figure 7:
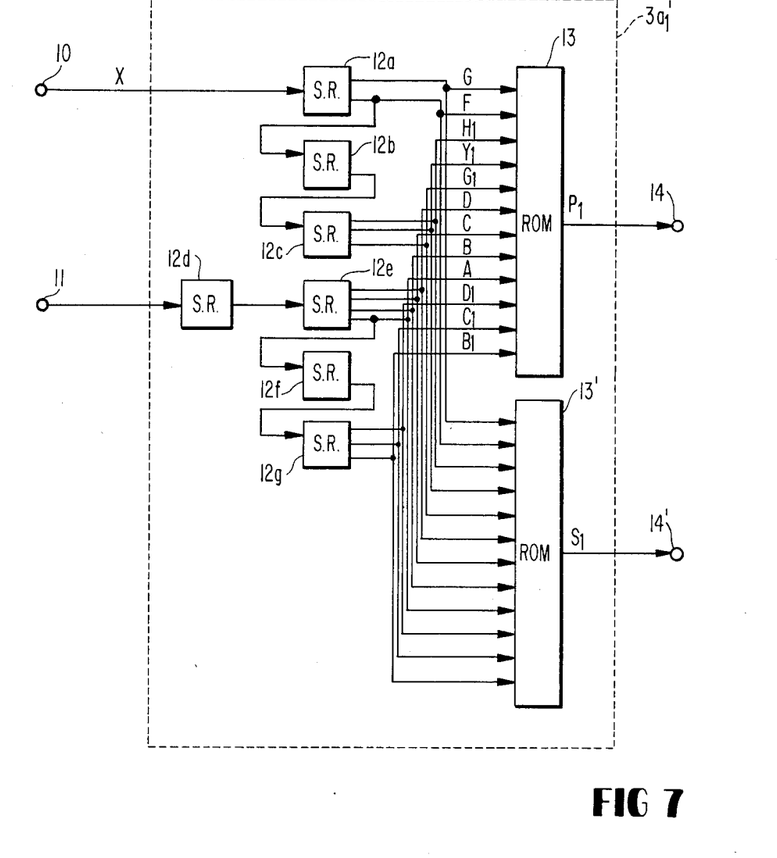
FIG. 7 is a block diagram of a predictor $3a_1'$ used in the second embodiment of the invention shown in FIG. 6.

Referring to FIG. 6, an adaptive predictive encoding apparatus according to a second embodiment of this invention is used for encoding a prediction state signal in an encoder 7'. The prediction state signal is used for classifying the predictive error signals in accordance with prediction hitting ratios which are previously obtained statistically with respect to the respective reference picture elements. In the case where, for example, two prediction states are assumed, the patterns are classified into one having the prediction hitting ratio more than 0.95 and other into those having a lower prediction hitting ratio. In FIG. 6, the prediction state signals $S_1$, $S_2$, - - - $S_n$ and the predictive values $P_1$, $P_2$, - - - , $P_n$ are obtained from predictors $3a_1'$, $3a_2'$, - - - , $3a_n'$ each composed of shift registers and ROM's. As shown in FIG. 7, the predictor $3a_1'$ is identical to the predictor $3a_1$ shown in FIG. 3 except that a ROM 13' for generating the prediction state signal $S_1$ is added.

Selector 6' selects the prediction state signal S and the predictive error signal Y. The selected predictive error signal Y and prediction state signal S are encoded in the encoder 7'. The run-length encoding for the predictive error signal and prediction state signal is disclosed, for example, in the Japanese Patent Disclosure No. 55-41080.

Figure 8:
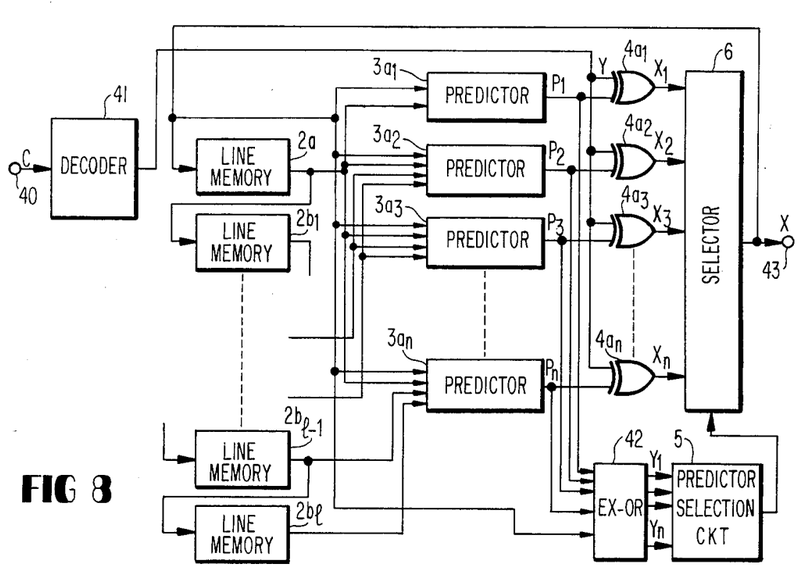
FIG. 8 is a block diagram of an adaptive predictive decoding apparatus according to a third embodiment of this invention.

Referring to FIG. 8, an adaptive predictive decoding apparatus according to a third embodiment of this invention is used for decoding the code which has been encoded by the encoding apparatus shown in FIG. 2. In FIG. 8, the constructual elements having the same reference numerals as those in FIG. 2 are identical.

The encoded code supplied to an input terminal 40 is decoded in a decoder 41 to produce a predictive error signal Y. The predictive error signal Y is supplied to the exclusive OR circuits $4a_1$, $4a_2$, . . . , $4a_n$ which are supplied with predictive values $P_1$, $P_2$, - - - , $P_n$ from the predictors $3a_1$, $3a_2$, - - - , $3a_n$ to produce decoded signals $X_1$, $X_2$, - - - , $X_n$. The selector 6 selects one from the decoded signals $X_1$, $X_2$, - - - , $X_n$ as the decoded signal X in response to the selective signal from the predictor selection circuit 5. An exclusive OR circuit 42 generates the predictive error signals $Y_1$, $Y_2$, - - - , $Y_n$ from the predictive values $P_1$, $P_2$, - - - , $P_n$ and the decoded signal X and supplies it to the predictor selection circuit 5.

Figure 9:
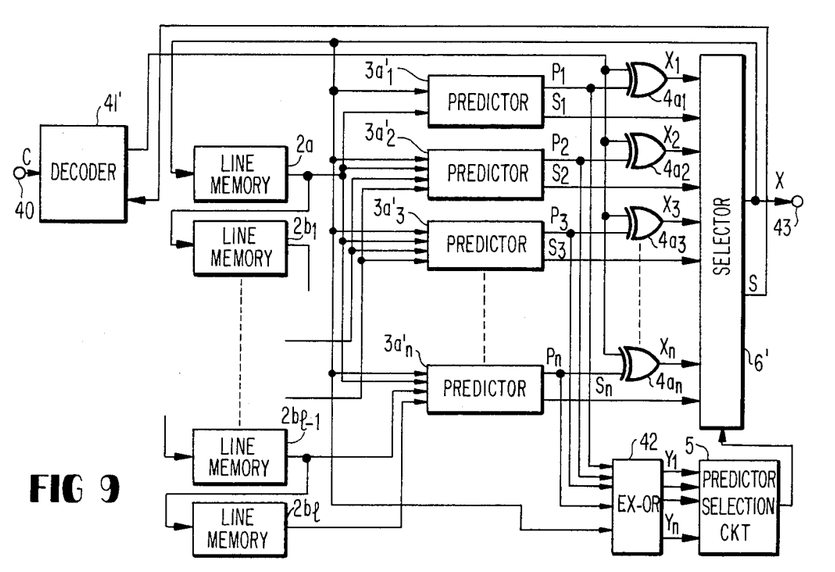
FIG. 9 is a block diagram of an adaptive predictive decoding apparatus according to a fourth embodiment of this invention.

Referring to FIG. 9, an adaptive predictive decoding apparatus according to a fourth embodiment of this invention is used for decoding the code which is encoded by the encoding apparatus shown in FIG. 6, and is identical to the decoding apparatus shown in FIG. 8 except that a decoder 41' decodes the predictive error signal by using the prediction state signal. The predictors $3a_1'$, $3a_2'$, - - - , $3a_n'$ and the selector 6' are identical to the corresponding predictors and selector of the FIG. 6 embodiment.

As described above in detail, according to this invention, one of a plurality of predictive values obtained by a plurality of predictors is selected in response to a comparison of mis-predictions in the predictive error signals for the already scanned picture elements, to thereby provide a high prediction effect and make it possible to use an MH encoder because the prediction mode code representative of the selected prediction mode is not used.

What is claimed is:

1. An adaptive predictive encoding apparatus comprising:

means for generating a plurality of predictive values $P_1$, $P_2$, - - - , $P_n$ with respect to a quantized value X of a picture element x from quantized values of neighboring picture elements to said picture element x, a plurality of picture elements $Y_1$, $Y_2$, - - - , $Y_n$ having the same phase relationship as said picture element x to their corresponding neighboring picture elements on a two-dimensional screen-period pattern, and the neighboring picture elements to said plurality of picture elements $Y_1$, $Y_2$, - - - , $y_n$;

means for obtaining predictive error signals $Y_1$, $Y_2$, - - - , $Y_n$ from said quantized value X and said plurality of predictive values $P_1$, $P_2$, - - - , $P_n$;

means for comparing the mis-predictions obtained from said predictive error signals for the already scanned picture elements to provide a comparison result;

means for generating a selection signal in response to said comparison result;

means for selecting one from said plurality of predictive error signals $Y_1$, $Y_2$, - - - , $Y_n$ to provide a predictive error signal Y in response to said selection signal; and means for encoding said predictive error signal Y to produce an encoded signal;

wherein said means for generating a plurality of predictive values $P_1$, $P_2$, - - - , $P_n$ comprises, a plurality of series connected one line memories ($2a$, $2b$, - - - , $2bj$), including a first memory receiving said quantized value x;

a plurality or predictors ($3a_1$, - - - , $3a_n$), each predictor having a plurality of inputs and producing a different predictive value ($P_1$, $P_2$, - - - , $P_n$) according to a different predictive method, one input to each predictor receiving said quantized value X, the remaining inputs to each of said predictors being connected to the outputs of selected ones of said series connected one line memories.

2. The adaptive predictive encoding apparatus as claimed in claim 1, wherein each of said predictors comprises a plurality of shift registers and at least one read only memory connected to the outputs of selected ones of said plurality of shift registers.

3. The adaptive predictive encoding apparatus as claimed in claim 1, wherein each of said predictors comprises a plurality of shift registers and first and second read only memories connected to the outputs of selected ones of said plurality of shift registers, the output of said first read only memory being a predictive value P, the output of said second read only memory being a prediction state signal S, to thereby produce a plurality of prediction state signals $S_1$, $S_2$, - - -, $S_n$ in addition to said plurality of predictive values $P_1$, $P_2$, - - -, $P_n$.

4. The adaptive predictive encoding apparatus as claimed in claim 3, wherein said means for selecting one from said plurality of predictive error signals $Y_1$, $Y_2$, - - -, $Y_n$ further includes means for selecting one from said plurality of prediction state signals $S_1$, $S_2$, - - -, $S_n$ to provide a prediction state signal S in response to said selection signal, and wherein said encoding means further includes means for encoding said selected prediction state signal S.

5. An adaptive predictive encoding apparatus comprising:
means for generating a plurality of predictive values $P_1$, $P_2$, - - -, $P_n$ with respect to a quantized value X of a picture element x from quantized values of neighboring picture elements to said picture element x, a plurality of picture elements $y_1$, $y_2$, - - -, $y_n$ having the same phase relationship as said picture element x to their corresponding neighboring picture elements on a two-dimensional screen-period pattern, and the neighboring picture elements to said plurality of picture elements $y_1$, $y_2$, - - -, $y_n$;
means for obtaining predictive error signals $Y_1$, $Y_2$, - - -, $Y_n$ from said quantized value X and said plurality of predictive values $P_1$, $P_2$, - - -, $P_n$;
means for comparing the mis-predictions obtained from said predictive error signals for the already scanned picture elements to provide a comparison result;
means for generating a selection signal in response to said comparison result;
means for selecting one from said plurality of predictive error signals $Y_1$, $Y_2$, - - -, $Y_n$ to provide a predictive error signal Y in response to said selection signal; and
means for encoding said predictive error signal Y to produce an encoded signal;
wherein said comparing means and said selection signal generating means comprises a plurality of delay circuits each receiving a different one of said predictive error signals $Y_1$, $Y_2$, - - -, $Y_n$, a plurality of mis-prediction measuring circuits, a mis-prediction measuring circuit being connected to the output of each of said delay circuits, and a comparator means for comparing the outputs from said mis-prediction measuring circuits, said comparator means producing at its output the selection signal indicating which of the predictive error signals produced the least number of mis-predictions.

6. The adaptive predictive encoding apparatus as claimed in claim 5, wherein each of said delay circuits comprises a plurality of series connected one line memories and a plurality of shift registers, a shift register being connected to the output of each of said one line memories.

7. An adaptive predictive decoding apparatus for decoding an encoded signal which is produced by encoding a predictive error signal Y, which is obtained by selecting one from a plurality of predictive error signals $Y_1$, $Y_2$, - - -, $Y_n$ which are obtained from a quantized value X of a picture element x and a plurality of predictive values $P_1$, $P_2$, - - -, $P_n$ with respect to said value X, said decoding apparatus comprising:
means for decoding said encoded signal to produce said predictive error signal Y;
means for obtaining a plurality of decoded signals $X_1$, $X_2$, - - -, $X_n$ from said predictive error signal Y and a plurality of predictive values $P_1$, $P_2$, - - -, $P_n$;
means for generating said predictive values $P_1$, $P_2$, - - -, $P_n$ from a neighboring picture element to said picture element x, a plurality of picture elements $y_1$, $y_2$, - - -, $y_n$ having the same phase-relationship as said picture element x to their corresponding neighboring picture elements on a two-dimensional screen-period pattern, and neighboring picture elements to said plurality of picture elements $y_1$, $y_2$, - - -, $y_n$;
means for obtaining a plurality of predictive error signals $Y_1$, $Y_2$, - - -, $Y_n$ from said quantized value X and said plurality of predictive values $P_1$, $P_2$, - - -, $P_n$;
means for calculating the mis-predictions obtained for said plurality of predictive values $P_1$, $P_2$, - - -, $P_n$ from predictive error signals $Y_1$, $Y_2$, - - -, $Y_n$ for the already scanned picture elements to provide a calculation result; and
means for selecting one from said plurality of decoded signals $X_1$, $X_2$, - - -, $X_n$ to provide the quantized value X of said picture element x;
wherein said means for generating a plurality of predictive values $P_1$, $P_2$, - - -, $P_n$ comprises,
a plurality of series connected one line memories ($2a$, $2b$, - - -, $2bj$), including a first memory receiving said quantized value X,
a plurality of predictors ($3a_1$, - - -, $3a_n$), each predictor having a plurality of inputs and producing a different predictive value ($P_1$, $P_2$, - - -, $P_n$) according to a different predictive method, one input to each of said predictors receiving said quantized value X, the remaining inputs to each of said predictors being connected to the outputs of selected ones of said series connected one line memories.

8. An adaptive predictive decoding apparatus as claimed in claim 7, wherein said means for generating said predictive values $P_1$, $P_2$, - - -, $P_n$ further includes means for generating a plurality of prediction state signals $S_1$, $S_2$, - - -, $S_n$,
said selecting means further including means for selecting one of said plurality of prediction state signals $S_1$, $S_2$, - - -, $S_n$.

9. The adaptive predictive decoding apparatus as claimed in claim 7, wherein each of said predictors comprises a plurality of shift registers and at least one read only memory connected to the outputs of selected ones of said plurality of shift registers.

10. The adaptive predictive decoding apparatus as claimed in claim 7, wherein each of said predictors comprises a plurality of shift registers and first and second read only memories connected to the outputs of selected ones of said plurality of shift registers, the output of said first read only memory being a predictive value P, the output of said second read only memory being a prediction state signal S, to thereby produce a plurality of prediction state signals $S_1, S_2, ---, S_n$ in addition to said plurality of predictive values $P_1, P_2, ---, P_n$.

11. An adaptive predictive decoding apparatus for decoding an encoded signal which is produced by encoding a predictive error signal Y, which is obtained by selecting one from a plurality of predictive error signals $Y_1, Y_2, ---, Y_n$ which are obtained from a quantized value X of a picture element x and a plurality of predictive values $P_1, P_2, ---, P_n$ with respect to said value X, said decoding apparatus comprising:

means for decoding said encoded signal to produce said predictive error signal Y;

means for obtaining a plurality of decoded signals $X_1, X_2, ---, X_n$ from said predictive error signal Y and a plurality of predictive values $P_1, P_2, ---, P_n$;

means for generating said predictive values $P_1, P_2, ---, P_n$ from a neighboring picture element to said picture element x, a plurality of picture elements $y_1, y_2, ---, y_n$ having the same phase-relationship as said picture element x to their corresponding neighboring picture elements on a two-dimensional screen-period pattern, and neighboring picture elements to said plurality of picture elements $y_1, y_2, ---, y_n$;

means for obtaining a plurality of predictive error signals $Y_1, Y_2, ---, Y_n$ from said quantized value X and said plurality of predictive values $P_1, P_2, ---, P_n$;

means for calculating the mis-predictions obtained for said plurality of predictive values $P_1, P_2, ---, P_n$ from predictive error signals $Y_1, Y_2, ---, Y_n$ for the already scanned picture elements to provide a calculation result; and means for selecting one from said plurality of decoded signals $X_1, X_2, ---, X_n$ to provide the quantized value X of said picture element x;

wherein said calculating means and said selection signal generating means comprises a plurality of delay circuits each receiving a different one of said predictive error signals $Y_1, Y_2, ---, Y_n$, a plurality of mis-prediction measuring circuits, a mis-prediction measuring circuit being connected to the output of each of said delay circuits, and a comparator means for comparing the outputs from said mis-prediction measuring circuits, said comparator means producing at its output the selection signal for selecting the one from the plurality of decoded signals $X_1, X_2, ---, X_n$.

12. The adaptive predictive decoding apparatus as claimed in claim 11, wherein each of said delay circuits comprises a plurality of series connected one line memories and a plurality of shift registers, a shift register being connected to the output of each of said one line memories.

* * * * *